US008890745B2

(12) United States Patent
Wahlquist et al.

(10) Patent No.: US 8,890,745 B2
(45) Date of Patent: Nov. 18, 2014

(54) RF GUN BARREL DETECTION SYSTEM

(75) Inventors: Gary Fred Wahlquist, McKinney, TX (US); Kuang-Yuh Wu, Plano, TX (US)

(73) Assignee: Raytheon Company, Waltham, MA (US)

( * ) Notice: Subject to any disclaimer, the term of this patent is extended or adjusted under 35 U.S.C. 154(b) by 533 days.

(21) Appl. No.: 13/282,702

(22) Filed: Oct. 27, 2011

(65) Prior Publication Data

US 2013/0106643 A1      May 2, 2013

(51) Int. Cl.
*G01S 13/04*      (2006.01)
*G01S 7/41*      (2006.01)
*G01S 13/88*      (2006.01)

(52) U.S. Cl.
CPC ............... *G01S 13/04* (2013.01); *G01S 7/412* (2013.01); *G01S 13/887* (2013.01)
USPC ............................................. 342/22; 342/90

(58) Field of Classification Search
CPC ....... G01S 13/887; G01S 7/412; G01S 13/04; G01S 13/89; G01S 7/411; G01S 7/414; G01V 3/12
USPC ........................................ 342/22, 27, 90, 195
See application file for complete search history.

(56) References Cited

U.S. PATENT DOCUMENTS

| | | | | |
|---|---|---|---|---|
| 4,490,718 A | * | 12/1984 | Opitz et al. .................. | 342/192 |
| 4,641,137 A | * | 2/1987 | Opitz et al. .................. | 342/192 |
| 4,641,138 A | * | 2/1987 | Opitz .......................... | 342/192 |
| 5,726,375 A | | 3/1998 | Adams et al. | |
| 6,359,582 B1 | * | 3/2002 | MacAleese et al. ............ | 342/22 |
| 6,466,156 B1 | * | 10/2002 | Ulander ....................... | 342/25 R |
| 6,580,388 B1 | * | 6/2003 | Stoyanov et al. ............. | 342/192 |
| 7,382,312 B2 | | 6/2008 | Hintz | |
| 7,492,303 B1 | * | 2/2009 | Levitan et al. ................. | 342/22 |
| 7,920,088 B2 | * | 4/2011 | Thompson et al. ............. | 342/90 |
| 8,026,840 B2 | * | 9/2011 | Dwelly et al. .................. | 342/28 |
| 8,049,659 B1 | * | 11/2011 | Sullivan et al. ................ | 342/90 |
| 8,264,400 B2 | * | 9/2012 | Yapa et al. ..................... | 342/90 |
| 8,350,747 B2 | * | 1/2013 | DeLia et al. .................... | 342/22 |
| 8,362,945 B2 | * | 1/2013 | Nguyen et al. ................. | 342/90 |
| 8,610,622 B2 | * | 12/2013 | Sullivan et al. ................ | 342/90 |

(Continued)

FOREIGN PATENT DOCUMENTS

FR      2951554 A1 * 4/2011

OTHER PUBLICATIONS

Cipara, Tina, "Professor Uses Radar Signals to Help Safeguard Our Troops", University News, George Mason University, http://news.gmu/articles/6356?print=y, May 9, 2011, pp. 1-3.

(Continued)

*Primary Examiner* — John B Sotomayor
(74) *Attorney, Agent, or Firm* — Lando & Anastasi, LLP

(57) ABSTRACT

A method of detecting an object includes receiving first reflected radio frequency (RF) signals from a region using an antenna and generating a first backscattering signature of the region from the first reflected RF signals. The method further includes receiving second reflected RF signals from the region subsequent to receiving the first reflected RF signals and generating at least one second backscattering signature of the region from the second reflected RF signals. The method further includes detecting a difference between the first backscattering signature and the second backscattering signature, and providing a warning indication in response to the difference between the first backscattering signature and the second backscattering signature.

15 Claims, 9 Drawing Sheets

(56) References Cited

U.S. PATENT DOCUMENTS

| | | | |
|---|---|---|---|
| 2005/0099330 A1* | 5/2005 | Hausner et al. | 342/22 |
| 2007/0052576 A1* | 3/2007 | Hausner et al. | 342/22 |
| 2007/0205937 A1* | 9/2007 | Thompson et al. | 342/22 |
| 2008/0025614 A1 | 1/2008 | Hintz et al. | |
| 2008/0121827 A1 | 5/2008 | Cerwin et al. | |
| 2008/0284636 A1* | 11/2008 | Hausner et al. | 342/22 |
| 2009/0058710 A1* | 3/2009 | Levitan et al. | 342/22 |
| 2009/0195435 A1* | 8/2009 | Kapilevich et al. | 342/22 |
| 2010/0079280 A1 | 4/2010 | Lacaze et al. | |
| 2011/0025547 A1* | 2/2011 | Mohamadi et al. | 342/22 |
| 2012/0038505 A1* | 2/2012 | Sullivan et al. | 342/90 |
| 2012/0105267 A1* | 5/2012 | DeLia et al. | 342/22 |
| 2012/0105268 A1* | 5/2012 | Smits et al. | 342/22 |
| 2012/0112949 A1* | 5/2012 | Morgan | 342/22 |
| 2012/0256779 A1* | 10/2012 | Nguyen et al. | 342/90 |
| 2012/0293355 A1* | 11/2012 | Marianer et al. | 342/22 |
| 2013/0106643 A1* | 5/2013 | Wahlquist et al. | 342/27 |

OTHER PUBLICATIONS

Dogaru, Traian et al., "Through-the-Wall Small Weapon Detection Based on Polarimetric Radar Techniques", Army Research Laboratory, Dec. 2009.

Malachowski, Jonathan Paul, "A Microwave Analysis for the Pre-Shot Detection of Rifles", Scholarly Paper Presentation, Jul. 23, 2010.

Sheen, David M. et al., "Near-Field Millimeter-Wave Imaging for Weapon Detection", Presented at the Intelligent Robots and Visual Communications, Boston, Massachusetts, Nov. 15-20, 1992.

\* cited by examiner

RF GUN BARREL DETECTION SYSTEM

BACKGROUND

Sniper detection systems are used to detect the presence of a gun or rifle. Some current systems accomplish this by measuring the acoustic shockwave that occurs when the gun is fired using an array of sensors. One notable disadvantage of this technique is that the gun cannot be detected until it is fired, which increases the risk of danger to a human target. Other current systems can detect light reflected off of the optics in a gun scope; however, this technique cannot detect guns without scopes.

Another current technique proposes to use radio waves to detect the presence of objects based on the resonance properties of the object. For example, U.S. Patent Application Publication No. 2010/0079280 by Lacaze et al. discloses that a tailor-made signal can be configured to resonate with specific objects, such as the barrel cavity of a gun. The resonated signal is reflected to a receiver that processes the signal and attempts to identify the presence and type of weapon by comparison with a library of tailor-made signals that are known to produce such resonance in specific weapons. The technique disclosed by Lacaze only detects a weapon if the signal is specifically tailored to interact with the weapon so as to create a specific signature in the frequency domain; other objects are not detected.

SUMMARY

Embodiments of the present disclosure are directed to weapon and object detection systems and methods that detect, among other things, a gun aimed at a target before the gun is fired. In at least one embodiment, a unique backscattering signature is generated using radio frequency (RF) signals reflected off of an object. The signature is compared with pre-determined backscattering signatures using statistical analyses to detect the presence and type of the object. A warning is provided to the target if the object is identified as a gun or other threatening object.

According to one embodiment, a method of detecting an object includes receiving first reflected radio frequency (RF) signals from a region using an antenna, generating a first backscattering signature of the region from the first reflected RF signals, receiving second reflected RF signals from the region using the antenna subsequent to receiving the first reflected RF signals, generating at least one second backscattering signature of the region from the second reflected RF signals, detecting a difference between the first backscattering signature and the at least one second backscattering signature, and providing a warning indication in response to the difference between the first backscattering signature and the at least one second backscattering signature.

In one example, the method further includes determining whether the at least one second backscattering signature substantially matches a pre-determined backscattering signature associated with an object of interest from a library of pre-determined backscattering signatures. In another example, the warning indication is a first warning indication, and the method further includes providing a second warning indication to the user in response to determining that the at least one second backscattering signature substantially matches the pre-determined backscattering signature.

In another example, the method further includes calculating at least one derivative of a difference between the at least one second backscattering signature and the pre-determined backscattering signature in response to determining that the at least one second backscattering signature substantially matches the pre-determined backscattering signature. In another example, the object of interest includes a gun barrel, wherein the at least one derivative includes an average difference that is less than approximately +1.0 dB and greater than approximately −1.0 dB, and wherein providing the second warning indication further includes providing the second warning indication to the user subsequent to calculating the average difference. In another example, the object of interest includes a gun barrel, wherein the at least one derivative includes a standard deviation that is less than approximately 3 dB, and wherein providing the second warning indication further includes providing the second warning indication to the user subsequent to calculating the standard deviation.

In another example, the method further includes receiving third reflected RF signals from the region using the antenna subsequent to receiving the second reflected RF signals, generating a plurality of third backscattering signatures from the third reflected RF signals, and determining whether the plurality of third backscattering signatures converge over time with respect to the pre-determined backscattering signature. In another example, the method further includes calculating at least one derivative of a difference between the plurality of third backscattering signatures and the pre-determined backscattering signature. In another example, the at least one derivative includes an average difference and the warning indication is a first warning indication, and the method further includes determining whether the average difference is less than approximately 0.5 dB, and providing a second warning indication to the user in response to determining that the average difference is less than approximately 0.5 dB.

According to one embodiment, an object detection system includes an antenna configured to transmit radio frequency (RF) scanning signals and to receive first and second reflected RF signals from a monitored region and a processor coupled to the antenna. The processor is configured to generate a first backscattering signature from the first reflected RF signals, generate at least one second backscattering signature from the second reflected RF signals, and detect a difference between the first backscattering signature and the at least one second backscattering signature. The object detection system further includes a warning device coupled to the processor and configured to provide a warning indication in response to the difference between the first backscattering signature and the at least one second backscattering signature.

In one example, the object detection system further includes a laser coupled to the processor and configured to illuminate at least a portion of the monitored region. The processor is further configured to energize the laser in response to detecting the difference between the first backscattering signature and the at least one second backscattering signature.

In another example, the object detection system further includes a camera coupled to the processor and configured to capture video images of the monitored region, and a user display for displaying the video images. The user display is coupled to the camera. The processor is further configured to control the camera to capture the video images and send the video images to the user display in response to detecting the difference between the first backscattering signature and the at least one second backscattering signature. In another example, the object detection system further includes a memory configured to store a pre-determined backscattering signature associated with an object of interest within a library of pre-determined backscattering signatures. The processor is coupled to the memory and further configured to determine whether the at least one second backscattering signature substantially matches the pre-determined backscattering signature. In another example, the warning indication is a first warning indication, and the processor is further configured to provide a second warning indication in response to determining that the at least one second backscattering signature substantially matches the pre-determined backscattering signature.

In another example, a matching backscattering signature includes the at least one second backscattering signature that substantially matches the pre-determined backscattering signature. The processor is further configured to calculate at least one derivative of a difference between the matching backscattering signature and the pre-determined backscattering signature. In another example, the object of interest includes a gun barrel and the at least one derivative includes an average difference that is less than approximately +1.0 db and greater than approximately −1.0 db. Providing the second warning indication further includes providing the second warning indication subsequent to calculating the average difference. In another example, the object of interest includes a gun barrel and the at least one derivative includes a standard deviation that is less than approximately 3 db. Providing the second warning indication further includes providing the second warning indication subsequent to calculating the standard deviation.

According to one embodiment, a weapon detection system includes an antenna configured to receive radio frequency (RF) signals including reflected RF signals from a region, a memory for storing a pre-determined backscattering signature associated with an object of interest from a library of pre-determined backscattering signatures, a display unit, and processing means, coupled to the memory and the display unit, for determining whether any of the reflected RF signals substantially match the pre-determined backscattering signature. In one example, the processing means further includes means for providing a warning indication at the display unit in response to determining that any of the reflected RF signals substantially match the pre-determined backscattering signature.

According to one embodiment, a threat detection system includes a broadband active antenna array configured to transmit radio frequency (RF) scanning signals and to receive reflected RF signals from a monitored region, a memory configured to store a first RF backscatter signature of an object of interest in the monitored region, and a processor coupled to the antenna array and to the memory and configured to compute a profile of changes in a plurality of second RF backscatter signatures based on the reflected RF signals. The processor is further configured to determine whether the profile of changes corresponds to the first RF backscatter signature of the at least one object of interest. The threat detection system further includes a warning device coupled to the processor and configured to generate a threat warning indication responsive to determining that the profile of changes corresponds to the first RF backscatter signature.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by reference signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures:

DETAILED DESCRIPTION

Figure 1:
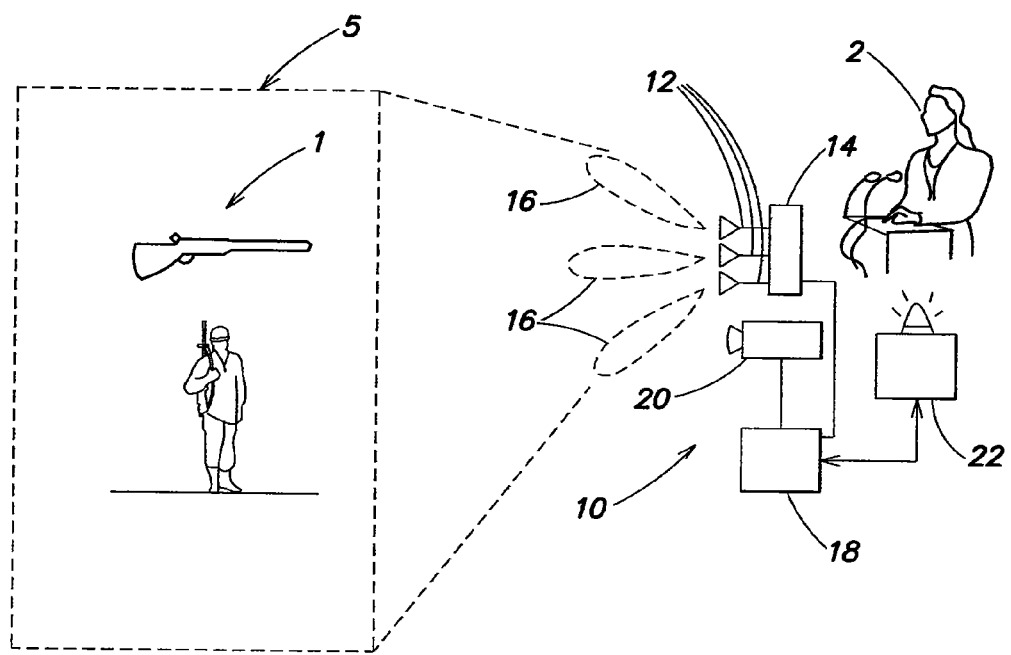
FIG. 1 is a block diagram of one example of a weapon detection system in accordance with aspects of the invention.

Public figures, soldiers, celebrities and others are increasingly at risk of becoming targets of terrorism or other violent acts. Guns are lethal weapons that can be effective at both close and long ranges, and are commonly used by those wishing to bring harm upon others. Furthermore, an undetected sniper can quickly inflict lethal injuries with a single shot and before reactive defensive measures can be undertaken. Preventing a sniper attack is especially challenging in open spaces or public venues, where it can be difficult to restrict access and where the sniper may find adequate cover among the surroundings. As discussed above, conventional weapon identification and detection techniques do not detect the presence of a gun before it is fired. Thus, according to various embodiments, it is appreciated that new techniques for detecting the presence of a gun threat before the gun is fired can be used to provide effective security countermeasures. These techniques can save lives and facilitate the apprehension of assailants.

At least one embodiment is directed to the detection of at least one gun before it is fired and warning the targeted individual and/or security personnel of the gun threat. Another embodiment includes identifying the location of the gun, as discussed further below.

In one embodiment, an antenna or an array antenna is used to transmit a broadband signal, referred to as the interrogation signal. The interrogation signal reflects off of one or more objects in a scanned region and is received by the antenna. The reflected signal, or backscatter, is used by a microprocessor or other computing device to generate one or more backscattering signatures (BSS) representing the objects and to detect their presence in the region based on the backscattering signatures. The BSS is a function of the proportion of reflected energy received by the antenna to transmitted energy with respect to the frequency of the signal over a range of frequencies. The BSS is unique for each object and is not dependent on the resonant properties of the object. The location of the detected objects may optionally be determined by correlating the respective antenna that received the backscatter with a portion of the region from which the signal was reflected.

In another embodiment, backscattering signatures are generated for a variety of known objects and stored in a library or database. For example, a gun barrel pointed at a target, within approximately +/−15 degrees, has a different and unique BSS than other types of objects (e.g., a solid metal dowel) when a sufficiently wide range of signal frequencies is used (e.g., between approximately 20 GHz and approximately 40 GHz). Although the amplitude of the BSS may vary with respect to the range of the object from the antenna, the unique signature pattern does not vary. Thus, as discussed further below, the BSS may be used to detect known, unknown or potentially threatening objects within a field of regard of the antenna array. The backscattering signatures of the known objects may be generated in advance and stored in the library or database for later use.

In another embodiment, the detected object is identified by comparing the BSS of the detected object with a pre-determined BSS of a similar object. The pre-determined BSS may, for example, be stored in the library as discussed above. In one example, the library may contain a pre-determined BSS of a gun barrel. Thus, if the BSS of the detected object matches the pre-determined BSS of the gun barrel, then the detected object is identified as a gun barrel. The comparison is accomplished using statistical analyses, including average differences and standard deviations, as further described below.

Embodiments of this invention are not limited in their application to the details of construction and the arrangement of components set forth in the following description or illustrated in the drawings. Embodiments of the invention are capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

FIG. 1 is a block diagram of a weapon detection system 10 according to one embodiment. The weapon detection system 10 is configured to detect, among other things, a gun 1 and/or a person carrying the gun within a monitored region 5. The system may be further configured to detect that the gun is aimed or being aimed toward a target 2. The target 2 may be, for example, a politician or VIP who is appearing in a public area to give a speech from a stage or podium. In another example, the target 2 may be a soldier patrolling hostile territory. The system 10 is configured to detect the gun before it is fired and annunciate an alert or warning in response to detecting the gun and/or other objects in the region 5. Such an alert or warning may be used by the potential target and/or security personnel to take evasive action or activate countermeasures before the gun is fired.

In one embodiment, the weapon detection system 10 includes at least one antenna 12 coupled to an antenna electronic unit (AEU) 14, a camera 20, a control unit 18, and an annunciator/display unit 22. Each antenna 12 transmits a signal, shown as a radiation lobe 16, which may be a directional signal for scanning different portions of the monitored region 5. The spread of each signal beam may be, for example, between approximately 15 degrees and approximately 30 degrees, and may be adjusted as necessary to provide sufficient signal coverage of the region 5 and for localization accuracy. In one example, the range of the signal is between approximately 50 meters and approximately 150 meters, which provides detection rates above 90% and error rates below 30%, although shorter and/or longer ranges may be used. The signal 16 is reflected by the gun 1, the person carrying the gun, or any other objects in the region 5, and the reflected signal is received by the antenna 12. The AEU processes the received signal and communicates the processed signal with the control unit 18. The camera 20 may optionally be coupled to the control unit 18. The camera 20 may be used to capture images of the monitored region 5. The annunciator/display unit 22 is coupled to the control unit 18, and may be configured to provide an audible and/or visual warning signal, for example, when the weapon detection system 10 detects a gun, or when another condition occurs, such as the detection of an unknown or new object within the region 5. The annunciator/display unit 22 may optionally be used, for example, to display the images captured by the camera 20.

The region 5 may include, for example, an area facing a stage, lectern, or podium where a potential sniper target is (or will eventually be) located. Such an area may be selected for monitoring based on where a sniper could appear, such as the balcony or catwalk area of an amphitheater, the exterior of a building, an open space in a park, or other region from which a sniper could fire a gun toward the target without obstruction. By locating the antenna 12 near the target 2, the backscatter from the gun 1, or other detected object(s), will propagate substantially along a line of sight between the gun and the target when the gun is aimed toward the target.

In one embodiment, the system 10 includes a laser (not shown) that is used as a countermeasure against the sniper. For example, if a gun is detected by the system 10, the laser can be activated and pointed in the direction of the gun to stun or blind the sniper.

Still referring to FIG. 1, according to various embodiments, the antenna 12 is mounted in close proximity to the target 2, for example, on or near a podium, a military vehicle, a bunker, or other location where the target 2 is expected to be. The antenna 12 may be stationary (e.g., affixed to a platform) or portable (e.g., attached to a vehicle or soldier's helmet). In one embodiment, the antenna 12 is a high frequency antenna, such as an X-band, Ku-band, K-band, or Ka-band antenna. Multiple antennas 12 may optionally be utilized to monitor a wider area of the region 5 for guns or other objects, or to provide increased object localization accuracy. For example, each antenna 12 may be configured with a beam spread of approximately 15 degrees and aimed at a different portion of the region 5 such that the antennas in the array together are arranged cover the entire region.

The annunciator/display unit 22 is, in one embodiment, located in close proximity to the target 2 so that the target can directly receive any alerts or warnings generated by the system 10; however the annunciator/display unit 22 may be located elsewhere, such as at a remote monitoring post. For example, in one embodiment, multiple systems 10 are connected to a central command unit (not shown) to enable centralized monitoring of multiple regions 5, and the annunciator/display unit 22 may be located at the central command unit. The camera 20 may, for example, be mounted such that the area where the detected gun 1, or detected sniper, can be viewed on the annunciator/display unit 22, or on another video display. The image may be used by a human operator to further identify the object, for example, to verify that the object is a gun and/or sniper, and to take further action.

According to one embodiment, radio waves are transmitted from the antenna(s) 12 toward the region 5 that is being monitored by the system 10. Some of the energy in the radio waves reflects back from the scanned region 5 toward the antenna 12. The reflection, or backscatter, is converted into a signature pattern (the BSS) at a single frequency or over a range of frequencies, for example, a frequency range of approximately 20 GHz to 40 GHz. The BSS is generated across a bandwidth sufficiently large enough that the BSS of an object is unique with respect to the BSS's of different objects. For example, the BSS may have a 1.5:1 to 4:1 bandwidth. If one dimension of the object of interest is D in inches, then the frequency range of a narrow bandwidth signal is between approximately 5/D GHz to 7.5/D GHz, and the frequency range of a wide bandwidth signal is between approximately 3/D GHz to 12/D GHz. This allows the object to be identified by substantially matching the BSS of the object with a pre-stored BSS known to be associated with the object, such as a gun barrel. In contrast, conventional object identification techniques use the resonant properties of the object at a single frequency or within a very narrow range of frequencies, and thus are unable to discriminate among different objects having similar resonance properties. In some embodiments, bandwidths of 4:1 or higher are used. The larger the bandwidth of the BSS is, the more likely that the BSS of a given object will be unique; however, the scan time and the cost to build the system may increase. The frequency range may be selected during detailed design of the system.

Figure 2:
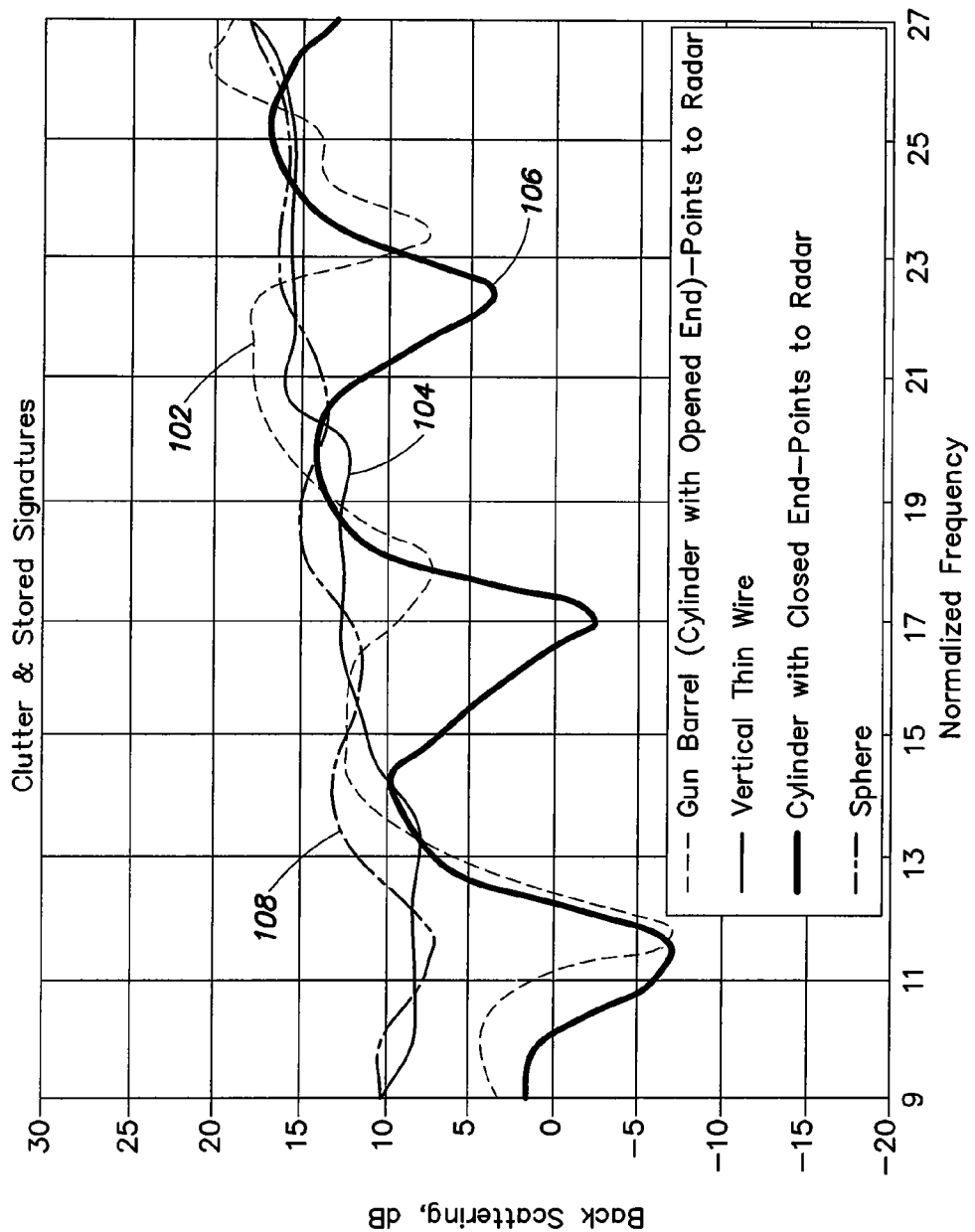
FIG. 2 is a graph representing backscattering signatures of various objects in accordance with aspects of the invention.

FIG. 2 shows a graph representing the backscattering signatures of several objects as a function of the normalized frequency of the interrogation signal. For example, a BSS 102 represents the backscattering signature of a gun barrel having a diameter of 0.31 inches. As can be seen, the BSS 102 is distinct from other backscattering signatures, including a BSS 104 of a thin wire (length=2 inches), a BSS 106 of a horizontally oriented closed cylinder (diameter=0.31 inches), and a BSS 108 of a sphere (diameter=1 inch). The BSS of the gun barrel 102 and closed cylinder 106 have the same length and diameter, and differ by the ends that are pointed toward the radar. For example, the gun barrel has an open end, and the closed cylinder has a closed end. BSS 102 and BSS 106 are distinguishable from each other. Thus, objects having similar physical characteristics can be differentiated from one another based on their unique BSS over a given bandwidth.

According to one embodiment, the system 10 is configured to generate a BSS for the region 5, which may contain one or more objects. For instance, the region 5 may contain clutter, which represents objects that are present in the region, such as walls, trees, posts, rails, and various fixed objects that may cause backscatter. The system 10 may be configured to create a clutter BSS for the region 5 by scanning the region 5 with radio waves, receiving the backscatter with the antenna 12, and generating a clutter BSS based on the backscatter. The clutter BSS may then be stored, for example, in a memory device or database coupled to the control unit 18. As discussed above, the BSS varies with respect to the type, configuration and number of objects in the region 5, and with respect to changes in the frequency of the interrogation signal. In other words, different objects and/or different combinations of objects in the region 5 produce different and unique signatures across a range of frequencies. Accordingly, subsequent scans of the region 5 may then be used to generate additional backscattering signatures, each of which can be compared to the clutter BSS stored in memory. Thus, changes in the backscattering signature over time can be used by the system 10 to detect when one or more new objects are introduced into the region 5 and/or when one or more objects are removed from the region, as well as changes in the aspect of certain objects.

For example, an initial BSS associated with the clutter in region 5 may be used to establish a baseline BSS of the region 5 for comparison with a subsequently generated BSS. The subsequently generated BSS does not differ substantially from the initial or other prior BSS's unless and until the composition of objects in the region 5 changes (e.g., at least one object is introduced or removed from the region, or the aspect of an object changes). For example, if a person enters the region 5, a BSS generated while the person is present will differ from the baseline BSS. Similarly, a change in the aspect of a gun from being held vertically to being aimed at the target causes a change in the BSS for the region 5.

Figure 3A:
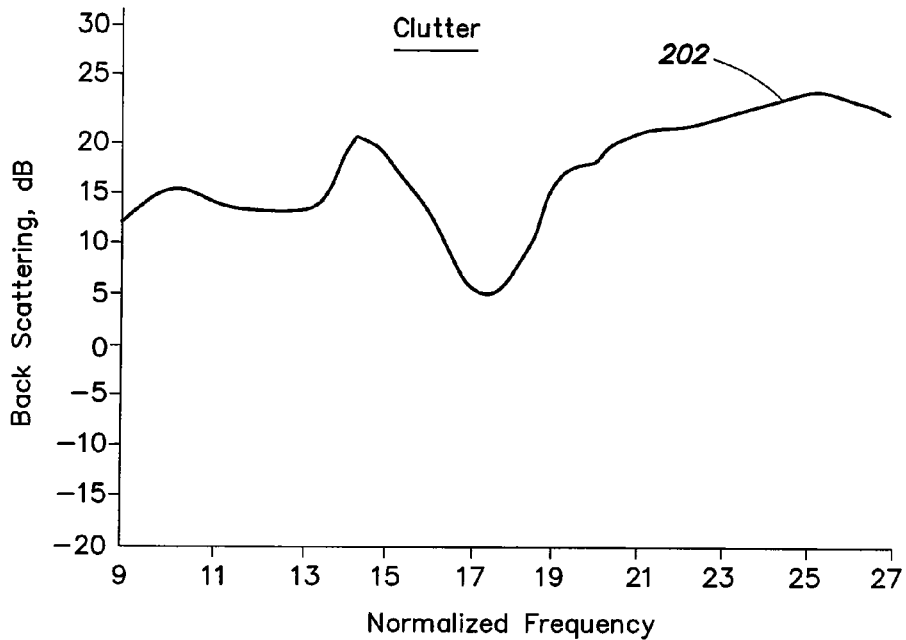
FIGS. 3A-3C are graphs representing backscattering signatures of various objects in accordance with aspects of the invention.

FIGS. 3A through 3D are graphs representing several backscatter signatures (BSS) that are generated by the system 10 of FIG. 1, according to one embodiment. FIG. 3A shows a baseline or clutter BSS 202 for several objects in the region 5, including a length of thin wire, a spherical object, and a metal dowel pointed at the antenna 12.

In one embodiment, the system 10 can detect changes in the region 5 by periodically generating a BSS for the region 5, comparing each new BSS to the previously generated BSS, and determining that the signatures are dissimilar. Dissimilar backscattering signatures indicate that the number of objects, or aspect of the object(s), in the region 5 has changed. For example, the system 10 may generate a BSS subsequent to a new object being introduced into the region 5. The new BSS is compared to a previously generated BSS (e.g., a BSS generated before the new object was introduced into the region), and the system 10 detects the presence of the new object based on this comparison.

Figure 3B:
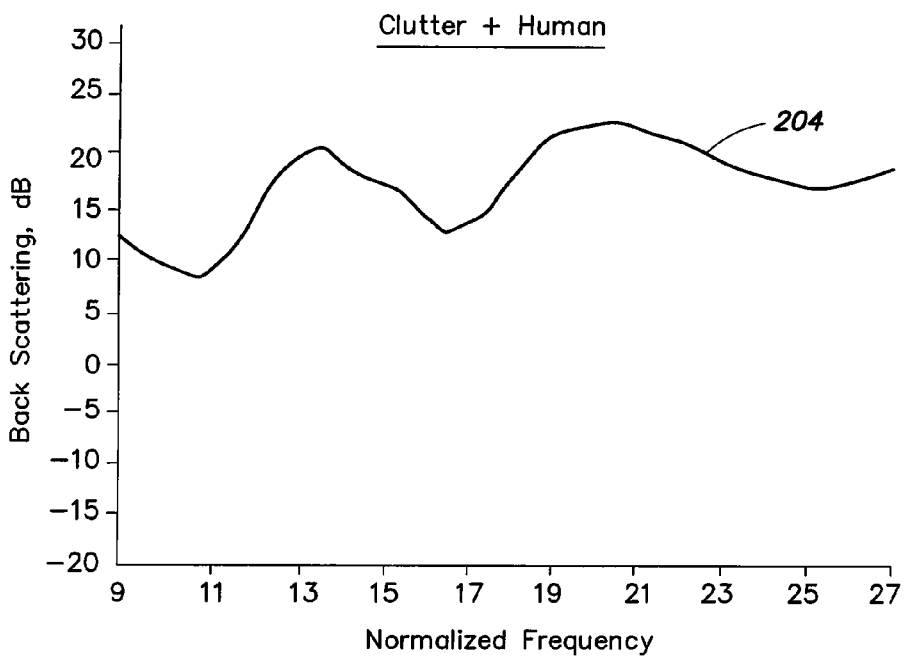
Figure 3C:
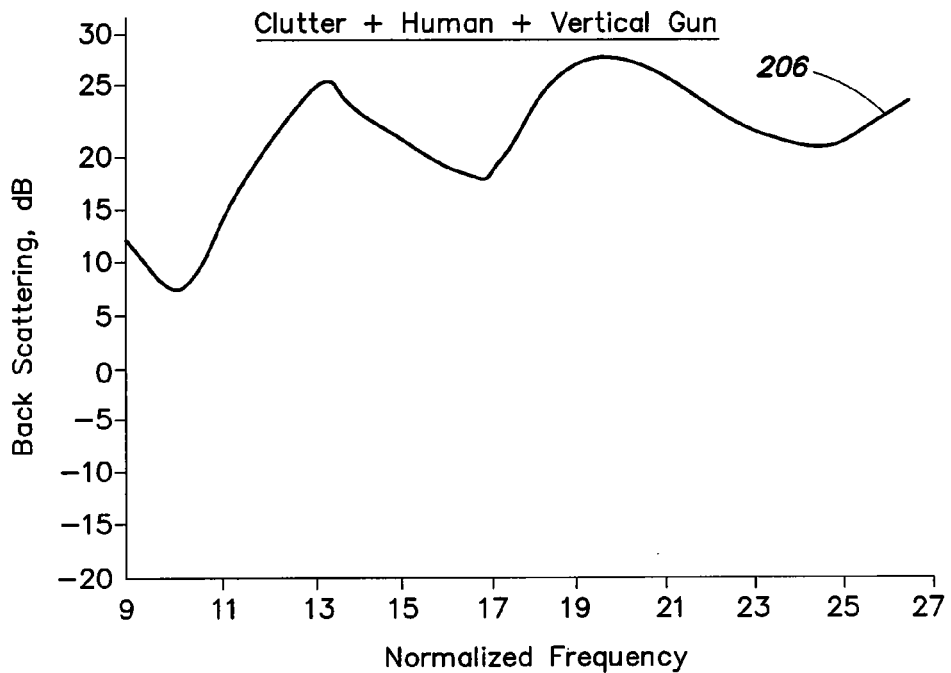
Figure 3D:
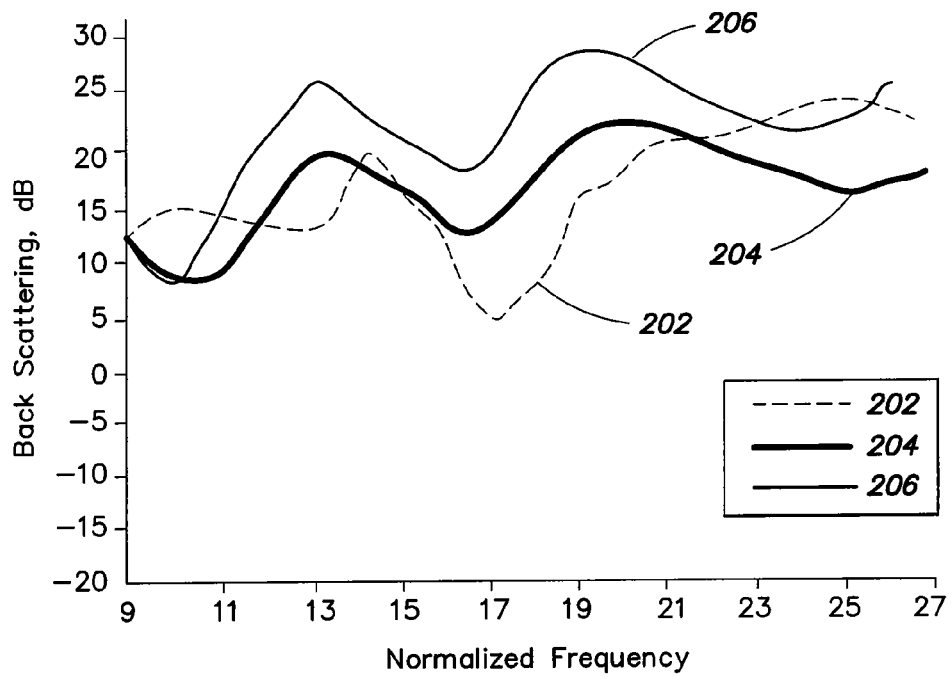
FIG. 3D is a graph representing an overlay of the backscattering signatures shown in FIGS. 3A-3C.

FIG. 3B shows a graph representing another BSS 204 of the region 5 (still containing the objects associated with FIG. 3A) when a human is introduced. As can be seen in the comparison graph of FIG. 3D, the BSS 204 is distinct from the BSS 202 over the frequency range. In another example, if the person in the region 5 is carrying a gun with the barrel held vertically, then another BSS 206 results, as shown by the graph of FIG. 3C. Again, as can be seen in the comparison graph of FIG. 3D, the BSS 206 is distinct from BSS 202 and BSS 204. Therefore, the system 10 can identify the presence of a human, a person carrying a gun, or other objects introduced into the region 5 by comparing the unique BSS associated with each combination of objects to the baseline BSS 202 of the clutter.

For example, a first BSS of the region 5, such as BSS 202, is generated at a first point in time, such as during setup or configuration of the system 10. A subsequent scan of the region 5 is used to generate a second BSS. The first BSS is compared to the second BSS. Differences between the first BSS and the second BSS may indicate a change in the composition of objects in the region 5 since the first BSS was generated, for example, the introduction and/or removal of one or more objects to/from the region. For instance, the introduction of a new object into the region 5 may indicate that an unauthorized person has entered the region, such as a sniper carrying a gun. In one embodiment, the system 10 is configured to scan the region 5 and generate a BSS periodically, for example, at least once every 100 nanoseconds or less. The BSS's may be individually compared, either with one another or against a baseline BSS as discussed above, or may be analyzed collectively over time, as discussed further below.

Figure 4:
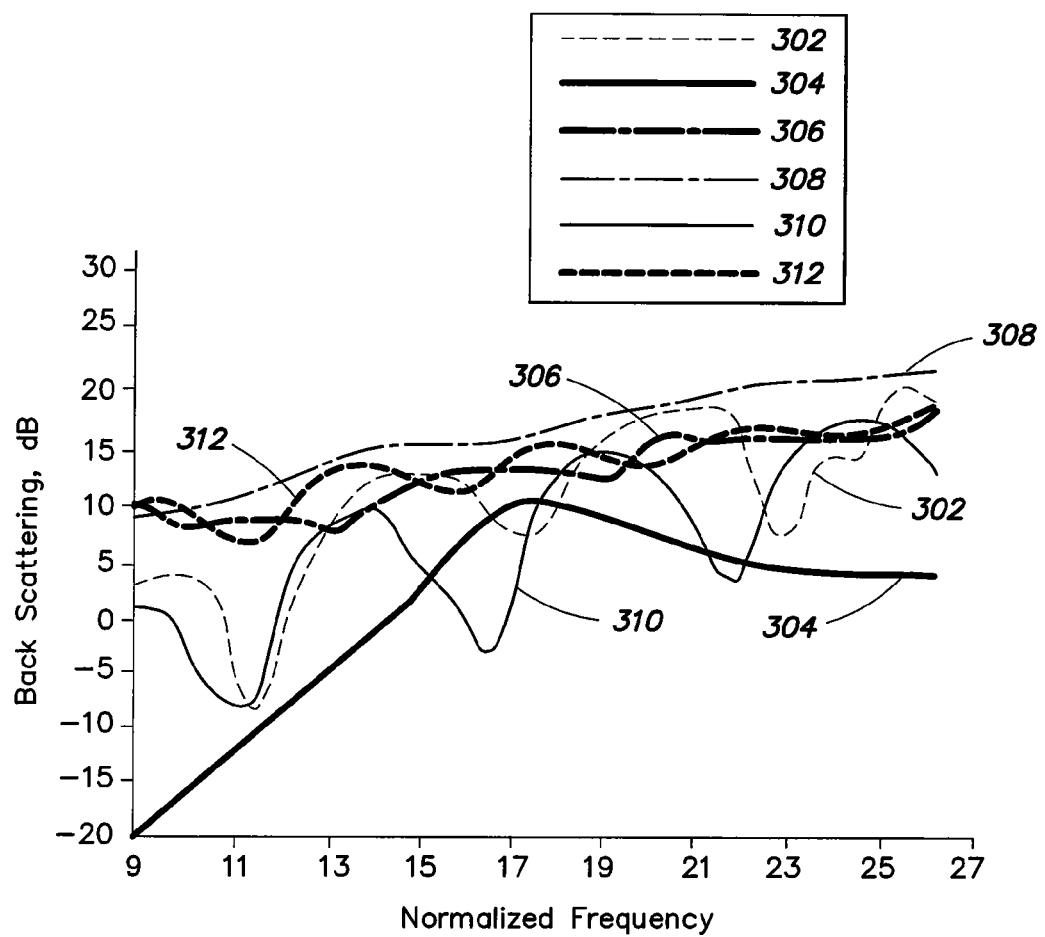
FIG. 4 is a graph representing backscattering signatures of various objects in accordance with aspects of the invention.

As discussed above, different objects, or the same object oriented differently with respect to the antenna, have uniquely identifiable BSS's. FIG. 4 is a graph illustrating several backscattering signatures for a variety of different objects, according to one embodiment. BSS 302 represents the signature of a gun barrel oriented at 90 degrees with respect to the sinusoidal radio waves that are reflecting from the gun; that is, with the gun barrel pointed substantially toward the radar antenna 12 (e.g., horizontal). In this example, the gun barrel is approximately 1 inch long (simplified for illustrating the system design concept) and has a diameter of 0.31 inches. The BSS 302 may be compared to the backscattering signatures of other objects; for instance, a BSS 304 of a length of resonant wire oriented at zero degrees (e.g., vertical), a BSS 306 of a length of thin wire oriented at zero degrees (e.g., vertical), a BSS 308 of a closed or solid cylinder oriented at 0 degrees (e.g., vertical), a BSS 310 of the same closed cylinder oriented at 90 degrees (e.g., horizontal), and a BSS 312 of a spherical object, as shown in FIG. 4. The dimensions of various exemplary objects corresponding to the BSS's shown in FIG. 4 are given in Table 1 below.

TABLE 1

Figure 5A:
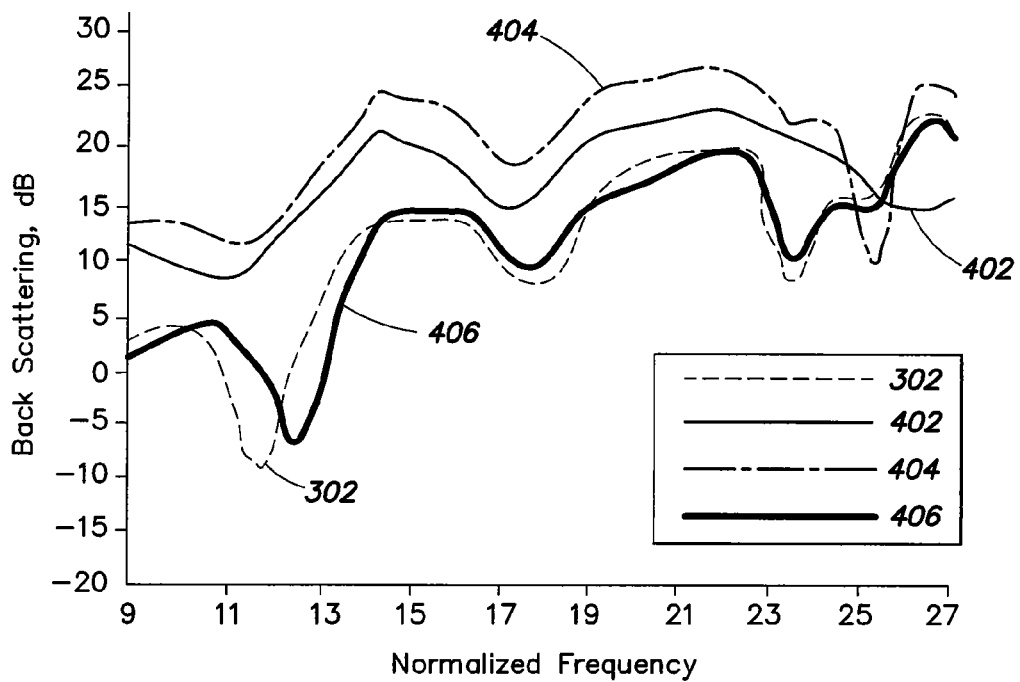
FIG. 5A is a graph representing backscattering signatures of various objects, including a gun barrel, in accordance with aspects of the invention.
Figure 5B:
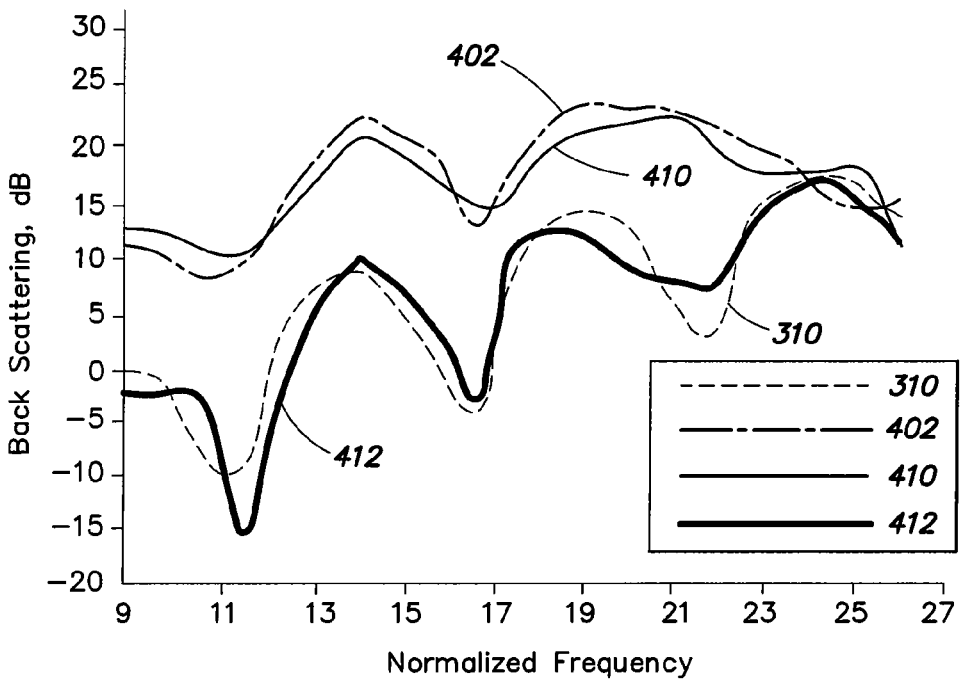
FIG. 5B is another graph representing backscattering signatures of various objects, including a closed cylinder, in accordance with aspects of the invention.

Dimensions of objects in FIGS. 4, 5A and 5B.

| Ref. # | Object | Length | Diameter |
|---|---|---|---|
| 302 | Gun barrel | 1.00" | 0.31" |
| 304 | Resonant wire | 0.31" | 0.01" |
| 306 | Thin wire | 2.00" | 0.01" |
| 308, 310 | Closed cylinder | 1.00" | 0.31" |
| 312 | Sphere | — | 1.00" |

A collection of backscattering signatures for a variety of objects, such as the objects represented by the signatures of FIG. 4, may be generated and stored in a library or database. As can be seen in FIG. 4, the backscattering signatures of each object are distinct from one another. The stored backscattering signatures may be used to identify objects in the region 5 by comparing a BSS of the region against one or more of the stored signatures. The library of stored signatures may include BSS's associated with various threat objects, such as a gun, as well as objects that have similar physical characteristics to the threat objects, for example, a metal cylinder that may resemble a gun. The collection of signatures may thus be used by the system 10 to detect and identify potential threats in region 5.

According to another embodiment, an object detected in the region 5 using the above technique is identified by the system 10 using a statistical comparison between at least one of the backscattering signatures stored in the library and one or more of the backscattering signatures generated for the region 5. Because the backscattering signature of an object, such as a gun barrel, is unique and substantially determinate, a signature generated for an object in the region 5, that has been normalized by subtracting the baseline backscattering signature (e.g., to remove the clutter BSS), can be compared with a stored signature of a known object (e.g., a gun barrel). In some instances, a single comparison between a stored BSS and a normalized BSS of region 5 may be sufficient to determine whether a particular object has entered region 5. In other examples, a plurality of BSS's of region 5 may be obtained over a relatively short period of time, for example, a few milliseconds, and collectively analyzed. For example, each BSS may be normalized and compared to one or more stored signatures of a known item, to provide a set of comparison data that can be used to identify an object in region 5. In one example, a statistical analysis can be performed on the comparison data. Such statistical measures may include an average difference and/or standard deviation between the stored signature and the plurality of BSS's generated by the system 10 over the period of time. Thus, these or other statistical measures can be used to determine a probability that the detected object corresponds to a known object. For example, if the average difference between the generated signatures and the stored signature are within a pre-determined range or limit, the object detected in the region 5 can be identified with a high degree of confidence as the known object associated with the stored signature. In one embodiment, the time period over which the signatures are collected and analyzed is sufficiently short that the system 10 may detect a gun 1 (or other threatening object) quickly enough to alert or warn the target 2 before a sniper is able to fire the gun.

FIG. 5A is a graph showing the backscattering signatures of one or more objects in the region 5. A first BSS 402 is a clutter or baseline BSS representing all objects in the region 5 at a first point in time, for example, during setup or configuration of the system 10. The first BSS 402 is used as a basis of comparison against other backscattering signatures generated at subsequent points in time, for example, when other objects are introduced into the region 5. Although typically objects introduced into the region 5 may be of primary interest, it should be understood that the removal of objects from the region can also be detected. Similarly, a change in aspect or orientation of certain objects within the region 5 may also be detected, as discussed above.

A second BSS 404, also shown in FIG. 5A, is a backscattering signature representing a combination of the clutter and a newly detected object that has been introduced into the region 5 at a second point in time (e.g., subsequent to the first point in time). The first BSS 402 may be compared to the second BSS 404. As can be seen, the first BSS 402 is distinct from the second BSS 404; this difference is one indication that a new object is detected in the region 5. In one example, based on there being a difference between the first BSS 402 and the second BSS 404, the second BB 404 may be normalized to produce a third BSS 406. The third BSS 406 is a signature representing the newly detected object. The third BSS 406 may be compared with one or more stored backscattering signatures in the library, for example, with the stored BSS 302, which as described above with respect to FIG. 4 represents the signature of a gun barrel. For clarity, backscattering signatures of other known objects (e.g., other backscattering signatures stored in the library) are not shown in FIG. 5A.

As discussed above, according to one embodiment, the second BSS 404 and third BSS 406 are actually each a collection of signatures collected over a short time period such that a statistical comparison is made by the control unit 18 between the stored BSS 302 (i.e., the BSS of a gun barrel) and the and/or third BSS 406 of the new object to determine if there is sufficient confidence to declare a match between the third BSS 406 and the stored BSS 302. For example, if the average difference between the stored BSS 302 and the third BSS 406 is within a confidence threshold, then the newly detected object is identified by the system 10 as a gun barrel. The confidence threshold may be determined based on the stored backscattering signatures of several different objects including the gun barrel, such that the statistical comparison enables the system 10 to discriminate between the BSS of the gun barrel and the BSS of the different objects. In one embodiment, the confidence threshold for the average difference is between approximately −1.00 dB and approximately +1.00 dB. In another example, if the standard deviation between stored BSS 302 and the third BSS 406 is within another confidence threshold, then the newly detected object is identified by the system 10 as a gun barrel. In one embodiment, the confidence threshold for the standard deviation is approximately 3.00 dB or less. In yet another example, the newly detected object is identified as a gun barrel if both of the above conditions occur.

The statistical comparison may be made, for example, between the third BSS 406 and any of the stored backscattering signatures, such as those described above with respect to FIG. 4. Table 2 below shows the average difference and the standard deviation between the third BSS 406 and several other stored backscattering signatures for objects oriented vertically (0°) or horizontally (90°) with respect to the antenna 12.

TABLE 2

Statistical comparison of stored BSS's with BSS 406 in FIG. 5A.

| Objects | Resonant wire @ 0° | Gun barrel @ 90° | Thin wire @ 0° | Closed cylinder @ 0° | Closed cylinder @ 90° | Sphere |
|---|---|---|---|---|---|---|
| Avg. difference (dB) | 10.27 | 0.03 | −1.83 | −5.49 | 3.14 | −2.70 |
| Std. deviation (dB) | 6.21 | 2.70 | 4.30 | 3.88 | 5.83 | 4.58 |

As can be seen in the second data column of Table 2, the third BSS 406 has an average difference of 0.03 dB (which is within the range of −1.00 to 1.00 dB) when compared to the stored backscattering signature of the gun barrel aimed at the antenna 12. By contrast, as shown the first and third through sixth columns of Table 2, the average differences between the third BSS 406 and the stored backscattering signatures of other objects are each greater than 1.00 or less than −1.00 dB. Therefore, based on the average difference it can be determined with reasonable confidence that the object represented by the third BSS 406 is a gun barrel and not one of the other objects.

Again referring to the second data column of Table 2, the third BSS 406 has a standard deviation of 2.70 dB (which is less than 3.00 dB) when compared to the stored backscattering signature of the gun barrel. By contrast, as shown in the first and third through sixth columns of Table 2, the standard deviations between the third BSS 406 and the stored backscattering signatures of other objects are each greater than 3.00 dB. Therefore, based on the standard deviation the object represented by the third BSS 406 is a gun barrel and not one of the other objects.

By contrast, and as shown in FIG. 5B, if the newly detected object is not a gun barrel, the statistical comparison between the signature(s) of a known object(s) and the signature of the detected object will fail to indicate that the newly detected object is a gun barrel. FIG. 5B is substantially similar to FIG. 5A, except that FIG. 5B shows a fourth BSS 410, which is a signature representing the clutter and a different object that has been introduced into the region 5. As can be seen, the clutter BSS 402 is distinct from the fourth BSS 410; the differences between the two signatures are an indication that a new object has been detected in the region 5 by the system 10.

Again referring to FIG. 5B, a fifth BSS 412 is another signature representing the newly detected object. As discussed above, the fifth BSS 412 may be representative of a collection of fifth BSS's obtained over a given time interval and which may be collectively analyzed to obtain statistical information. The fifth BSS 412 is compared, by the control unit 18, with one or more stored signatures in the library (such as shown in FIG. 4), for example, with the stored BSS 310, which represents the signature of a closed cylinder, and the stored BSS 302, which represents the signature of a gun barrel. For clarity, backscattering signatures of other objects are not shown in FIG. 5B.

In one embodiment, a statistical comparison is made by the control unit 18 between the stored BSS 310 and the fifth BSS 412 to determine if there is sufficient confidence to declare a match between the fifth BSS 412 and the stored BSS 310. For example, if the average difference between the stored BSS 310 and the fifth BSS 412 is between approximately −1.00 dB and +1.00 dB, then the newly detected object is identified by the system 10 as a closed cylinder at 90 degrees. In another example, if the standard deviation between BSS 310 and BSS 412 is approximately 3.00 dB or less, then the newly detected object is identified as a closed cylinder at 90 degrees. In yet another example, the newly detected object is identified as a closed cylinder at 90 degrees if both the average difference and the standard deviation criterion described above are satisfied.

The statistical comparison may be made, for example, between the fifth BSS 412 and any of the stored backscattering signatures, such as those described above with respect to FIG. 4. Table 3 below shows the average difference and the standard deviation between the fifth BSS 412 and several other stored backscattering signatures for objects oriented vertically (0°) or horizontally (90°) with respect to the antenna 12.

TABLE 3

Statistical comparison of stored BSS's with BSS 412 in FIG. 5B.

| Objects | Resonant wire @ 0° | Gun barrel @ 90° | Thin wire @ 0° | Closed cylinder @ 0° | Closed cylinder @ 90° | Sphere |
|---|---|---|---|---|---|---|
| Avg. difference (dB) | 6.76 | −3.48 | −5.34 | −9.00 | −0.38 | −6.21 |
| Std. deviation (dB) | 7.04 | 4.32 | 5.51 | 4.69 | 2.48 | 4.80 |

As can be seen in the fifth data column of Table 3, the fifth BSS 412 has an average difference of −0.38 dB (which is less than 1.00 and greater than −1.00 dB) when compared to the stored BSS of the closed cylinder. By contrast, as shown in the first through fourth and sixth data columns of Table 3, the average differences between the fifth BSS 412 and the stored backscattering signatures of other objects are each greater than 1.00 or less than −1.00 dB. Therefore, based on the average difference the object represented by the fifth BSS 412 is a closed cylinder and not one of the other objects. For example, when the fifth BSS 412 is compared with the stored BSS 302 of the gun barrel (see second data column of Table 3), the average difference of −3.48 dB is less than −1.00 dB; therefore, the newly detected object is not identified as a gun barrel based on the average difference.

Again referring to the fifth data column of Table 3, the fifth BSS 412 has a standard deviation of 2.48 dB (which is less than 3.00 dB) when compared to the stored BSS of the closed cylinder. By contrast, the standard deviations between the fifth BSS 412 and the stored backscattering signatures of other objects are each greater than 3.00 dB. Thus, it can also be determined from the standard deviations that the object is a closed cylinder and not one of the other objects. For example, when the fifth BSS 412 is compared with the stored BSS 302 of the gun barrel, the standard deviation of 4.32 dB is greater than 3.00 dB; therefore, the newly detected object is not identified as a gun barrel based on the standard deviation.

Figure 6A:
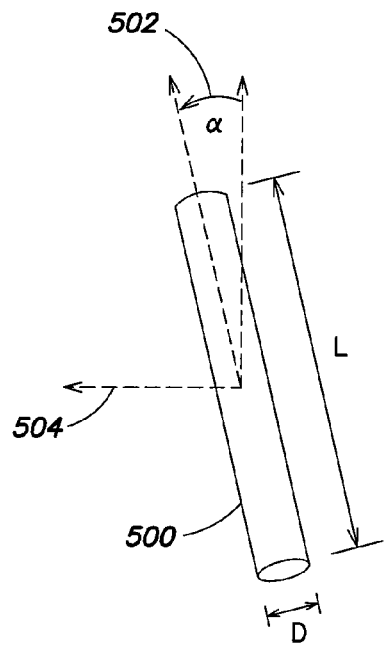
FIG. 6A is a schematic diagram of a gun barrel in accordance with aspects of the invention.

FIG. 6A is a schematic drawing representing a gun barrel 500 having a diameter D and a length L positioned at an angle 502 with respect to the propagation direction of a backscatter signal 504, which is the reflection of a signal transmitted by an antenna, such as antenna 12 in FIG. 1. The angle 502 is zero degrees when the barrel is substantially vertical with respect to the backscatter signal 504, and the angle 502 is 90 degrees when the barrel is substantially horizontal with respect to the backscatter signal 504.

Figure 6B:
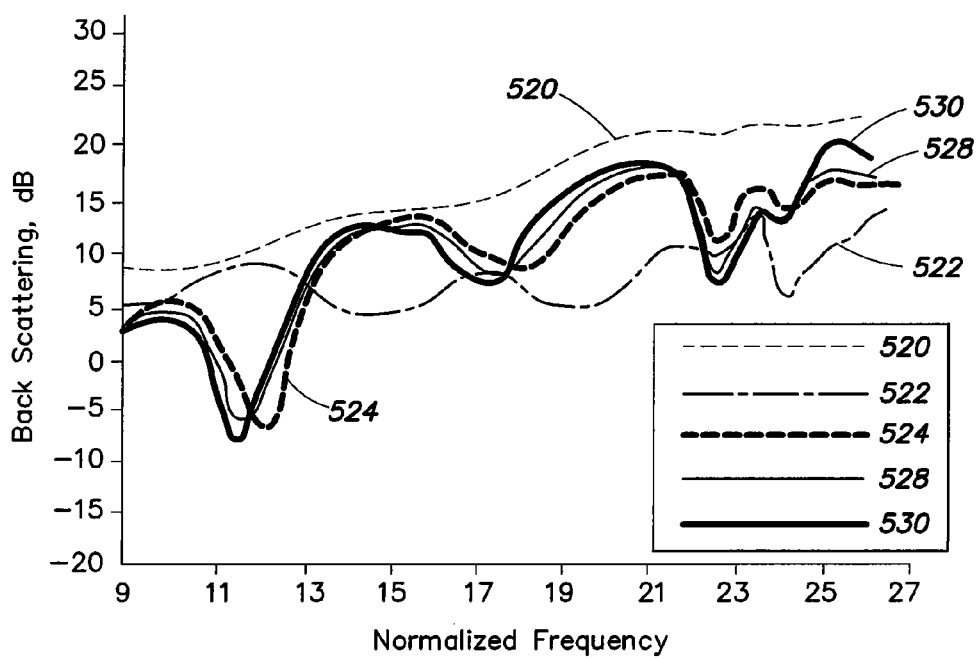
FIG. 6B is a graph representing the backscattering signature of the gun barrel of FIG. 6A at various angles in accordance with aspects of the invention.

FIG. 6B is a graph representing various backscattering signatures of the gun barrel 500 of FIG. 6A. Each backscattering signature shown in FIG. 6B results from the different orientations of the gun barrel 500 with respect to the backscatter signal 504; that is, different angles α, indicated at 502. In this example, the diameter D of the gun barrel is 0.31 inches and the length L of the gun barrel is 1 inch. Similar results can be obtained for gun barrels having different dimensions (e.g., 0.22" diameter and/or 2" length). Table 4 below is a legend for the graph of FIG. 6B.

TABLE 4

Backscattering Signatures of Gun Barrel in FIG. 6B.

| Ref. # | α |
|---|---|
| 520 | 0° |
| 522 | 45° |
| 524 | 75° |
| 528 | 80° |
| 530 | 90° |

As can be seen in FIG. 6B, the backscattering signatures converge as the angle 502 approaches 90 degrees, particularly for angles greater than approximately 60 degrees. A progression of movement of the gun barrel from zero towards 90 degrees may occur as a sniper takes aim toward the antenna and the target.

Thus, according to one embodiment, a sequence of converging backscattering signatures, for example, as shown in FIG. 6B, is used to detect and identify a gun barrel and warn the target 2. In the embodiment, the system 10 is configured to generate a sequence of backscatter signatures and compare the most recently generated signature to one or more previously generated signatures to determine if the signatures are converging toward a 90 degree signature, which, in this example, is BSS 530. For example, the control unit 18 may be configured to calculate an average difference between two subsequently generated backscattering signatures. If the average difference is less than a predetermined threshold, for example, approximately 0.5 dB, then the object is identified as a gun taking aim at the target 2, and a warning is issued.

Figure 7:
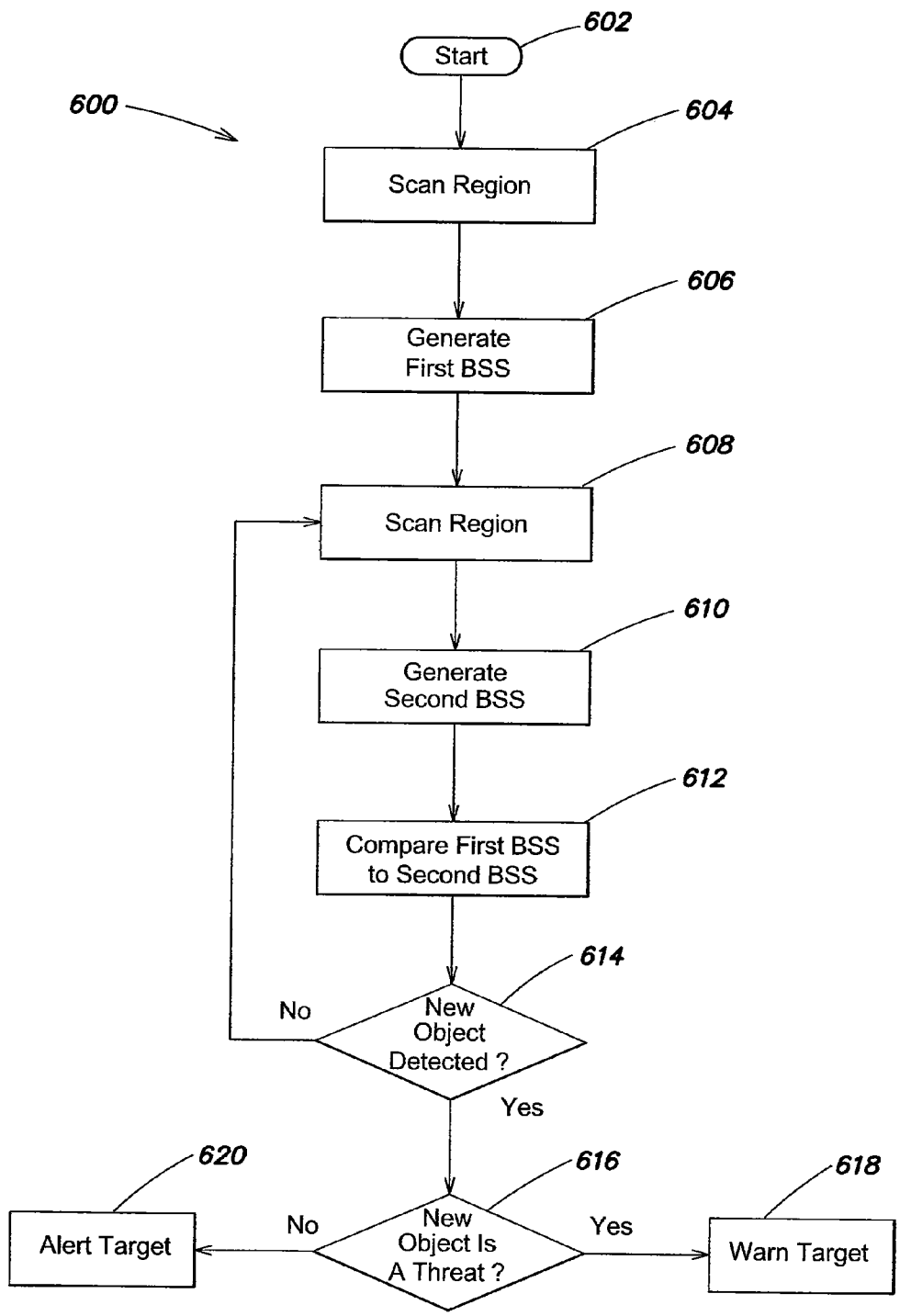
FIG. 7 is a flow diagram of a process for detecting a gun barrel in accordance with aspects of the invention.

FIG. 7 is a flow diagram of a process 600 for detecting a gun barrel according to one embodiment. Prior to performing process 600, the system, such as system 10 shown in FIG. 1, is installed and configured to scan a monitored region, such as region 5. Process 600 begins at step 602. At step 604, a first scan of the region is performed. Ideally, but not necessarily, the region is free of clutter or other objects that may enter or leave the region over time so as to establish a baseline backscattering signature that is substantially representative of the region at any given time. The backscatter of the scan is received by one or more of the antennas, such as antenna 12 in FIG. 1, and used to generate a first, or clutter, BSS at step 606. The clutter BSS is stored for future use in a library or database.

At step 608, a second, or subsequent, scan of the region is performed, and at step 610, a second BSS is generated based on the second or subsequent scan. At step 612, the second BSS is compared to the first BSS; if differences are present, then a new object in the region has been detected by the system, otherwise, no new object has been detected. At step 614, if a new object has been detected, then process 600 continues to step 616; otherwise, process 600 returns to step 608 to continue scanning the region for new objects.

At step 616, the second BSS is compared with the stored BSS of a gun barrel or other object that poses a threat. If there is sufficient confidence in a match (e.g., using one or more of the statistical analysis techniques described above), then the new object is accordingly identified as a gun or other threat, and the target is warned at step 618; otherwise, the target is alerted at step 620. The comparison of the stored BSS to the second BSS may be accomplished, for example, using the statistical techniques described above with respect to FIGS. 5A and 5B. In one embodiment, an alert includes, for example, sounding an audible alarm and/or illuminating a lighted signal, whereas a warning includes the above, but at a greater intensity (e.g., the audible alarm is louder or has a different tone, or the lighted indicator flashes a different color or at a faster interval) to indicate a greater urgency of action.

In another embodiment, not shown in FIG. 7, the process 600 may further include, in response to detecting a new object in the region, activating a camera that is trained on at least a portion of the region, and providing the video from the camera to a display unit that is monitored by a human operator. This enables the operator to visually inspect the region and verify that the new object is a gun and/or a sniper, or that another threat is present, or that no threat is present. In yet another embodiment, also not shown in FIG. 7, the process may further include, in response to detecting that the new object is a gun, activate a laser that is aimed in the direction of the new object to stun or blind the sniper.

Figure 8:
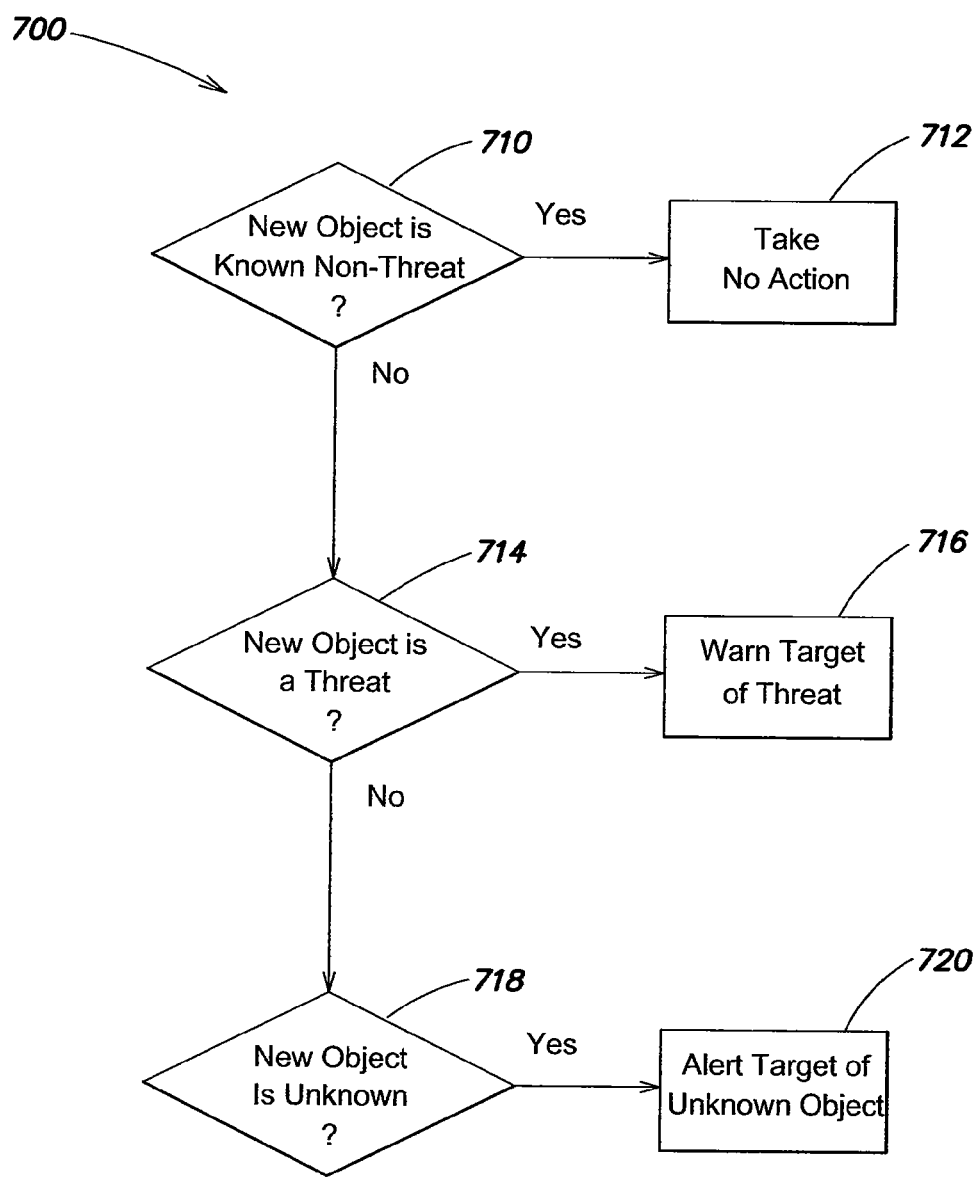
FIG. 8 is a flow diagram of a process for determining if a detected object is a threat in accordance with aspects of the invention.

As discussed above with respect to step 616 of FIG. 7, a determination is made as to whether the new object is a gun barrel or other threat. FIG. 8 is a flow diagram of a process 700 for determining if a detected object is a threat, according to another embodiment. For example, process 700 may be included within step 616 of the embodiment of FIG. 7.

At step 710, a BSS of the scanned region 5 is compared with the stored BSS of a plurality of known objects. If there is a match between the BSS of the scanned region 5 and a stored BSS of a non-threatening object (e.g., a pipe, a wire, a sphere), then, at step 712, no action is taken. However, at step 714, if there is a match between the BSS of the scanned region 5 and the stored BSS of a gun barrel or other threatening object, then, at step 716, the target is warned. Further, at step 718, if there is no match between the BSS of the scanned region 5 and any of the stored backscattering signatures, then the new object is unknown and, at step 720, the target is alerted. The comparison of the stored BSS to the BSS of the scanned region 5 may be accomplished, for example, using the statistical techniques described above with respect to FIGS. 5A and 5B. In one embodiment, an alert includes, for example, sounding an audible alarm and/or illuminating a lighted signal, whereas a warning includes the above, but at a greater intensity (e.g., the audible alarm is louder or has a different tone, or the lighted indicator flashes a different color or at a faster interval) to indicate a greater urgency of action.

Having thus described several aspects of at least one embodiment, it is to be appreciated various alterations, modifications, and improvements will readily occur to those skilled in the art. Such alterations, modifications, and improvements are intended to be part of this disclosure, and are intended to be within the spirit and scope of the invention. For example, the system may be configured to detect weapons other than guns, according to their respective unique backscattering signatures. Accordingly, the foregoing description and drawings are by way of example only, and the scope of the invention should be determined from proper construction of the claims and their equivalents.

What is claimed is:

1. A method of detecting an object, the method comprising:
   receiving first reflected radio frequency (RF) signals from a region using an antenna;
   generating a first backscattering signature of the region from the first reflected RF signals;
   receiving second reflected RF signals from the region using the antenna subsequent to receiving the first reflected RF signals;
   generating at least one second backscattering signature of the region from the second reflected RF signals;
   determining whether the at least one second backscattering signature substantially matches a pre-determined backscattering signature associated with an object of interest from a library of pre-determined backscattering signatures;
   receiving third reflected RF signals from the region using the antenna subsequent to receiving the second reflected RF signals;
   generating a plurality of third backscattering signatures from the third reflected RF signals;
   determining whether the plurality of third backscattering signatures converge over time with respect to the pre-determined backscattering signature;
   detecting a difference between the first backscattering signature and the at least one second backscattering signature; and
   providing a warning indication in response to the difference between the first backscattering signature and the at least one second backscattering signature.

2. The method of claim 1, wherein the warning indication is a first warning indication, and wherein the method further comprises providing a second warning indication to the user in response to determining that the at least one second backscattering signature substantially matches the pre-determined backscattering signature.

3. The method of claim 2, further comprising:
   in response to determining that the at least one second backscattering signature substantially matches the pre-determined backscattering signature, calculating at least one derivative of a difference between the at least one second backscattering signature and the pre-determined backscattering signature.

4. The method of claim 3, wherein the object of interest includes a gun barrel, wherein the at least one derivative includes an average difference that is less than approximately +1.0 dB and greater than approximately −1.0 dB, and wherein providing the second warning indication further includes providing the second warning indication to the user subsequent to calculating the average difference.

5. The method of claim 3, wherein the object of interest includes a gun barrel, wherein the at least one derivative includes a standard deviation that is less than approximately 3 dB, and wherein providing the second warning indication further includes providing the second warning indication to the user subsequent to calculating the standard deviation.

6. The method of claim 1, further comprising calculating at least one derivative of a difference between the plurality of third backscattering signatures and the pre-determined backscattering signature.

7. The method of claim 6, wherein the at least one derivative includes an average difference, wherein the warning indication is a first warning indication, and wherein the method further comprises:
   determining whether the average difference is less than approximately 0.5 dB; and
   providing a second warning indication to the user in response to determining that the average difference is less than approximately 0.5 dB.

8. An object detection system, comprising:
   an antenna configured to transmit radio frequency (RF) scanning signals and to receive first and second reflected RF signals from a monitored region;
   a memory configured to store a pre-determined backscattering signature associated with an object of interest within a library of pre-determined backscattering signatures;
   a processor coupled to the antenna and to the memory, the processor being configured to:
      generate a first backscattering signature from the first reflected RF signals;
      generate at least one second backscattering signature from the second reflected RF signals;
      detect a difference between the first backscattering signature and the at least one second backscattering signature;
      determine whether the at least one second backscattering signature substantially matches the pre-determined backscattering signature; and
      responsive to determining that the at least one second backscattering signature substantially matches the pre-determined backscattering signature, calculate at least one derivative of a difference between the matching backscattering signature and the pre-determined backscattering signature; and
   a warning device coupled to the processor and configured to provide a warning indication in response to the difference between the first backscattering signature and the at least one second backscattering signature.

9. The object detection system of claim 8, further comprising a laser coupled to the processor and configured to illuminate at least a portion of the monitored region, wherein the processor is further configured to energize the laser in response to detecting the difference between the first backscattering signature and the at least one second backscattering signature.

10. The object detection system of claim 8, further comprising:
   a camera coupled to the processor and configured to capture video images of the monitored region; and
   a user display for displaying the video images, the user display being coupled to the camera,
   wherein the processor is further configured to control the camera to capture the video images and send the video images to the user display in response to detecting the difference between the first backscattering signature and the at least one second backscattering signature.

11. The weapon detection system of claim 1, wherein the warning indication is a first warning indication, and wherein the processor is further configured to provide a second warning indication in response to determining that the at least one second backscattering signature substantially matches the pre-determined backscattering signature.

12. The weapon detection system of claim 8, wherein the object of interest includes a gun barrel, wherein the at least one derivative includes an average difference that is less than approximately +1.0 db and greater than approximately −1.0 db, and wherein providing the second warning indication further includes providing the second warning indication subsequent to calculating the average difference.

13. The weapon detection system of claim 8, wherein the object of interest includes a gun barrel, wherein the at least one derivative includes a standard deviation that is less than approximately 3 db, and wherein providing the second warning indication further includes providing the second warning indication subsequent to calculating the standard deviation.

14. A weapon detection system, comprising:
   an antenna configured to receive radio frequency (RF) signals including first and second reflected RF signals from a region;
   a memory for storing a pre-determined backscattering signature associated with an object of interest from a library of pre-determined backscattering signatures;
   a display unit; and
   processing means, coupled to the memory and the display unit, and configured to:
      generate a first backscattering signature of the region from the first reflected RF signals;
      generate at least one second backscattering signature of the region from the second reflected RF signals;
      determine whether the at least one second backscattering signature substantially matches the pre-determined backscattering signature;
      detect a difference between the first backscattering signature and the at least one second backscattering signature;
      provide a first warning indication at the display unit in response to the difference between the first backscattering signature and the at least one second backscattering signature; and
      provide a second warning indication at the display unit in response to determining that the at least one second backscattering signature substantially matches the pre-determined backscattering signature.

15. A threat detection system comprising:
   a broadband active antenna array configured to transmit radio frequency (RF) scanning signals and to receive first and second reflected RF signals from a monitored region;
   a memory configured to store a pre-determined RF backscatter signature of an object of interest in the monitored region;
   a processor coupled to the antenna array and to the memory and configured to compute a first RF backscatter signature from the first reflected RF signals, and a second RF backscatter signature from the second reflected RF signals, the processor further configured to determine whether the second RF backscatter signature corresponds to the pre-determined RF backscatter signature of the at least one object of interest, and to detect a different between the first RF backscatter signature and the second RF backscatter signature; and
   a warning device coupled to the processor and configured to generate a first threat warning indication responsive to the difference between the first RF backscatter signature and the second RF backscatter signature, and to generate a second threat warning indication responsive to determining that the second RF backscatter signature corresponds to the pre-determined RF backscatter signature.

\* \* \* \* \*